(12) United States Patent
Mahony

(10) Patent No.: US 8,815,093 B2
(45) Date of Patent: Aug. 26, 2014

(54) METHOD AND SYSTEM FOR PROVIDING EFFLUENT FROM AT LEAST ONE WASTEWATER TREATMENT PLANT

(75) Inventor: Robert J. Mahony, New York, NY (US)

(73) Assignee: Essential Water LLC, Bronx, NY (US)

( * ) Notice: Subject to any disclaimer, the term of this patent is extended or adjusted under 35 U.S.C. 154(b) by 400 days.

(21) Appl. No.: 13/112,535

(22) Filed: May 20, 2011

(65) Prior Publication Data

US 2011/0284088 A1 Nov. 24, 2011

Related U.S. Application Data

(60) Provisional application No. 61/346,705, filed on May 20, 2010.

(51) Int. Cl.
*C02F 3/00* (2006.01)
*F24D 15/00* (2006.01)

(52) U.S. Cl.
USPC ................. 210/600; 210/175; 165/47; 71/11

(58) Field of Classification Search
USPC ............ 210/600, 612, 175, 919, 920; 165/47; 71/11, 25
See application file for complete search history.

(56) References Cited

U.S. PATENT DOCUMENTS

| | | | | |
|---|---|---|---|---|
| 5,120,448 A | * | 6/1992 | Dorica et al. | 210/724 |
| 5,316,589 A | * | 5/1994 | Krieger, Jr. | 134/10 |
| 5,403,120 A | * | 4/1995 | Stekette, Jr. | 405/184.2 |
| 5,895,569 A | * | 4/1999 | Connelly | 210/170.08 |
| 6,007,720 A | * | 12/1999 | Tomita | 210/605 |
| 6,068,773 A | | 5/2000 | Sheaffer | |
| 6,284,138 B1 | * | 9/2001 | Mast | 210/606 |
| 6,730,224 B2 | * | 5/2004 | Blackburn | 210/604 |
| 2002/0020677 A1 | * | 2/2002 | Noll | 210/766 |
| 2005/0011828 A1 | * | 1/2005 | Hodgkinson et al. | 210/603 |
| 2006/0006055 A1 | * | 1/2006 | Bonde | 203/73 |
| 2006/0086660 A1 | * | 4/2006 | Hodgkinson et al. | 210/603 |
| 2008/0175668 A1 | | 7/2008 | Haese | |

FOREIGN PATENT DOCUMENTS

| | | |
|---|---|---|
| CN | 100584473 C | 3/2007 |
| JP | 10-156391 | 6/1998 |
| JP | 2006-55119 A * | 3/2006 |

OTHER PUBLICATIONS

Machine-generated English translation of CN 100584473, generated on Apr. 21, 2014.*
International Search Report mailed on Feb. 9, 2012 for International Application No. PCT/US2011/037394.
Chinese Office Action for Chinese Patent Application No. 201180030559.3 mailed on Dec. 24, 2013.

* cited by examiner

*Primary Examiner* — Fred Prince
(74) *Attorney, Agent, or Firm* — Andrews Kurth LLP

(57) ABSTRACT

Exemplary embodiments of using effluent from a wastewater treatment plant are provided, where treated wastewater can exploit geothermal energy while delivering usable thermal energy to buildings by passing through an effluent distribution system including mains. The effluent distribution system mains can also recover the effluent used in each building and return the thermally exploited effluent to one or more ecological recharge basins, where at each basin the mains can join an infrastructure to distribute effluent to vegetation or exploit geothermal energy throughout the basin before redistributing the geothermally regulated effluent to buildings, or export the effluent to a network of EDS, or import effluent from a network of EDS.

29 Claims, 8 Drawing Sheets

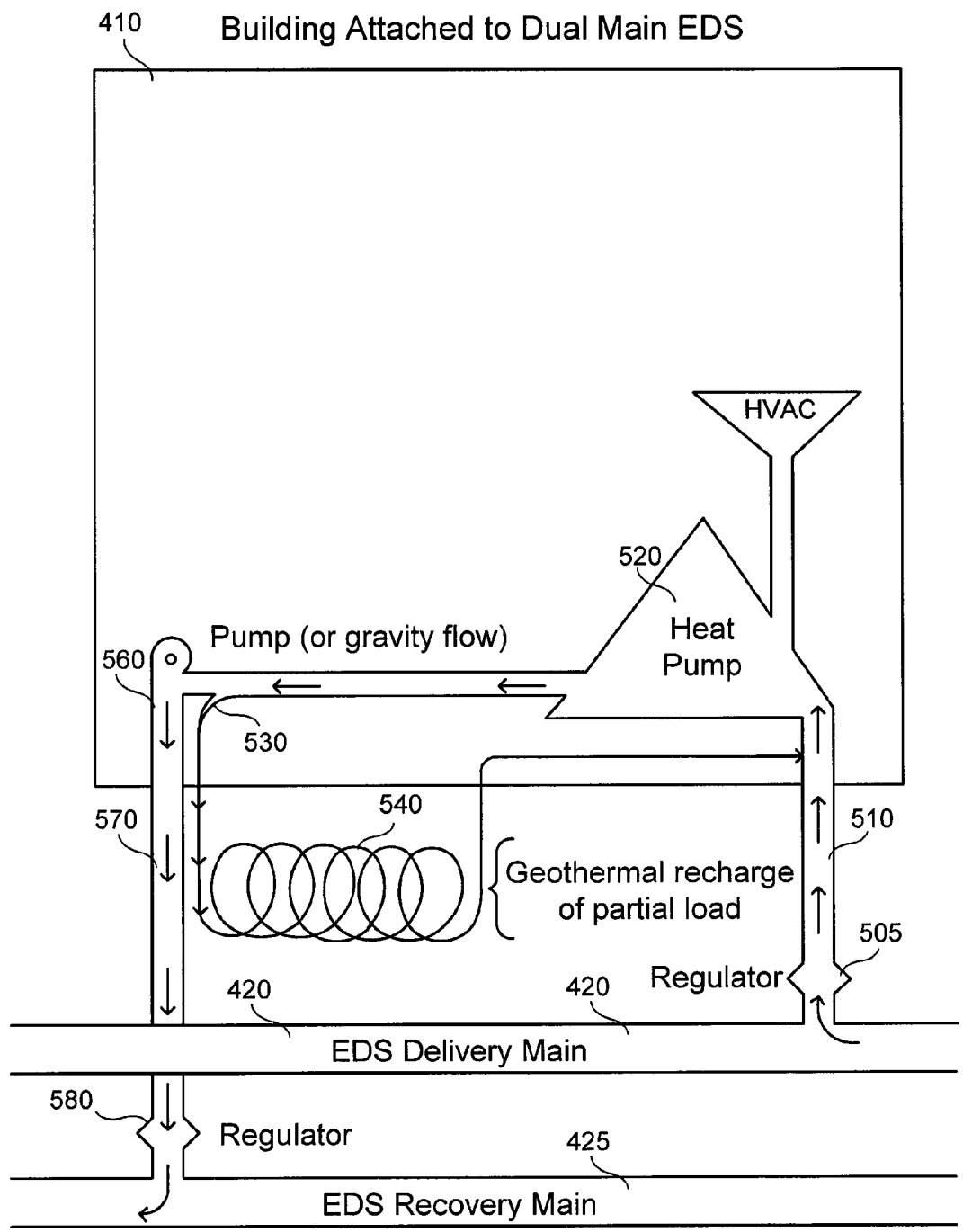
F I G. 5

METHOD AND SYSTEM FOR PROVIDING EFFLUENT FROM AT LEAST ONE WASTEWATER TREATMENT PLANT

CROSS-REFERENCE TO RELATED APPLICATION

This application claims priority under 35 U.S.C. §119(e) to U.S. Provisional Patent Application Ser. No. 61/346,705, filed on May 20, 2010, the entire disclosure of which is expressly incorporated herein by reference.

FIELD OF THE DISCLOSURE

The present disclosure relates to exemplary embodiments of methods and systems for providing effluent, and more particularly, to exemplary embodiments of methods and systems for providing effluent from at least one wastewater-treatment plant for heating and/or cooling buildings, and possibly fertilizing vegetation.

BACKGROUND INFORMATION

In efforts to increase generation thermal efficiencies, technologies are sometimes combined, such as steam and gas turbine technology. Efforts to find other renewable energy sources to reduce dependence on fossil fuels have spawned alternate fuels including the burning of agricultural waste such as wood chips, almond shells and rice hulls to generate power. Used tires, municipal solid waste in the form of a screened mass or refuse-derived fuel have also provided fuel for power generation. In the case of municipal solid waste, the fuel has been exploited in large part to reduce the amount of waste sent to landfills.

What is likely needed are ways to extend and/or augment the availability of renewable or natural resources beyond traditional system efficiency improvements, in order to prolong available energy resources and reduce the dependency on fossil fuels. In conjunction, certain methods of utilizing municipal waste and its byproducts may be preferable to ease an environmental impact of simple disposal, and also to provide a cleaner environment. Millions of gallons of effluent are produced in local wastewater treatment plants. Indeed, up to 30 million gallons per day of effluent are produced in some relatively small plants alone.

Accordingly, finding ways of using such effluent from wastewater treatment plants as an energy resource can benefit the environment and conserve resources.

SUMMARY OF EXEMPLARY EMBODIMENTS OF THE DISCLOSURE

At least some of the above described problems can be addressed by exemplary embodiments of the method and system for using effluent from at least one wastewater treatment plant, according to the present disclosure.

The present disclosure provides exemplary applications that can use effluent from at least one wastewater treatment plant (WWTP) to heat and cool buildings, and/or also possibly facilitate a fertilization of wild or cultivated vegetation in soil at an ecological recharge basin (ERB). The exemplary applications can indicate that water, when appropriately distributed below grade, can become a year-round, continuous reservoir of an exploitable thermal energy, e.g., via a heat-pump apparatus in a building that absorbs heat from effluent in winter and deposits heat in effluent in summer.

As effluent from at least one WWTP, treated wastewater can exploit a geothermal energy while delivering a usable thermal energy to buildings by passing through an effluent-distribution system (EDS) comprising pipes (or "mains," as in "gas mains" or "sewer mains"), which can be below grade. The EDS mains can also recover effluent used in each building, and return such thermally exploited effluent to several ERBs, where at each ERB, the mains can join an infrastructure to distribute effluent to vegetation and/or exploit the geothermal energy throughout the ERB before redistributing the effluent to buildings. In certain exemplary applications, a local network of mains can be provided to connect to each building and/or to a number of ERBs and WWTPs.

For example, at approximately 70° F., and comprising nitrogen compounds, effluent from a WWTP can be made suitable both for heating and cooling buildings that can be equipped with a heat-pump apparatus and for discharging nitrogen compounds into an ERB, where the vegetation can absorb nitrogen from the effluent and thereby filter water into groundwater tables.

Current WWTP operations discharge effluent directly into aquatic habitats, which can create a cycle of robust plant growth and decay that pollutes aquatic habitats by depleting oxygen levels. In some coastal locations, a discharge of large volumes of effluent offshore also weakens natural water-table barriers that otherwise would prevent salt-water incursions. The exemplary procedure, system, and method according to the exemplary embodiments of the present disclosure can reduce and/or eliminate a need to discharge effluent into the aquatic habitats, fortify water tables by recycling naturally filtered effluent into groundwater tables, fertilize vegetation intensively or extensively, and offer the opportunity to install WWTPs likely anywhere.

Current WWTP capacity is designed for treating a maximum flow of wastewater delivered by the capacity of sewer mains. In many systems, storm water likely commingles with wastewater in sewer mains. Consequently, the combined flow created by intense storms surpasses the peak-flow design of a WWTP, which results in untreated wastewater overflowing into aquatic habitats.

Returning effluent from a building's heat pump equipment to a WWTP through sewer mains can regulate and/or recharge the thermal load of the effluent, but may utilize additional WWTPs to compensate for increased sewer-main flow resulting from effluent commingling with maximum volumes of untreated wastewater. Storm water mains, when independent of sewer mains, can likewise regulate and/or recharge effluent temperature yet without affecting flow to WWTPs.

Similarly, to deliver effluent to heat pump equipment in each building and avoid a significant construction of new effluent-delivery mains, it is possible for natural gas distribution companies to replace natural gas delivered to buildings through low-pressure, local-distribution mains with WWTP effluent.

Current interstate, high-pressure, natural gas transmission lines transport natural gas to local power plants, which are often connected to the local natural-gas-distribution system. Many power plants using natural gas as a fuel receive it directly from high-pressure transmission lines, or from a local subset of reduced high-pressure transmission lines that subsequently feed into low-pressure, local-distribution systems. Natural gas unused by power plants at various high pressures is let out or down to lower pressure for local distribution through mains to buildings mostly as a fuel combusted for heating buildings, heating water, cooking food, cooling buildings, and at times for large commercial refrigeration applications.

Moisture in natural-gas mains or in high-pressure transmission lines would render natural gas a hazardous fuel. Consequently, converting a local natural-gas-distribution system into EDS delivery mains can be done by segregating the high-pressure transmission lines from the local-distribution mains. Segregation can preserve normal operation of current power generation plants and offer the option of modifying and expanding an existing local natural-gas-distribution infrastructure into an effluent-delivery infrastructure.

Replacing natural gas with effluent in a local natural-gas-distribution system can employ modifications to render some gas mains (which can vary in age, size, and material composition) effective for distributing effluent. If the natural-gas-distribution system is converted to EDS-delivery mains to heat and cool buildings, then gas stoves, hot-water service, and the applications of gas-fired commercial-scale refrigeration can be converted to electric applications.

The exemplary embodiments of the present disclosure can provide, e.g., a method for providing effluent from a wastewater treatment plant, which comprises distributing effluent from a wastewater treatment plant to at least one building for providing thermal energy to the at least one building, providing the effluent from the at least one building to a delivery arrangement, and providing the effluent from the delivery arrangement to a fertilization system.

The method can further comprise returning the provided effluent from the fertilization system for a redistribution to one or more buildings. The fertilization system can comprise one or more ecological recharge basins. The nitrogen can be provided by the effluent to the one or more ecological recharge basins. The one or more ecological recharge basins can denitrify the effluent before the effluent is provided to an aquatic habitat or returned to the local environment.

The delivery arrangement can comprise one or more pipes below grade. The effluent can be distributed from the wastewater treatment plant to the at least one building and can be provided to the fertilization system by the delivery arrangement. The delivery arrangement can comprise a main pipe, or can comprise at least one pipe for distributing the effluent from the wastewater treatment plant to the at least one building and at least one separate pipe for providing the effluent to the fertilization system. The effluent can also be distributed from the wastewater treatment plant to the at least one building by using existing gas lines.

The exemplary embodiments of the present disclosure can also provide for a system for providing effluent from a wastewater treatment plant, comprising a wastewater treatment subsystem configured to provide effluent to a first delivery arrangement, wherein the first delivery arrangement facilitates the effluent to at least one building, the at least one building including a heat-pump arrangement configured to utilize thermal energy from the effluent (for heating and/or cooling), and a second delivery arrangement which is configured to receive the utilized effluent from the at least one building and distribute the utilized effluent to a fertilization system. The fertilization system can comprise one or more ecological recharge basins.

These and other objects, features and advantages of the present disclosure will become apparent upon reading the following detailed description of exemplary embodiments of the present disclosure, when taken in conjunction with the appended claims.

BRIEF DESCRIPTION OF THE DRAWINGS

The foregoing and other objects of the present disclosure will be apparent upon consideration of the following detailed description, taken in conjunction with the accompanying drawings and claims, in which like reference characters refer to like parts throughout, and in which:

FIG. 5 is an illustration of a building using the dual-main effluent distribution system of FIG. 4 according to an exemplary embodiment of the present disclosure;

Figure 1:
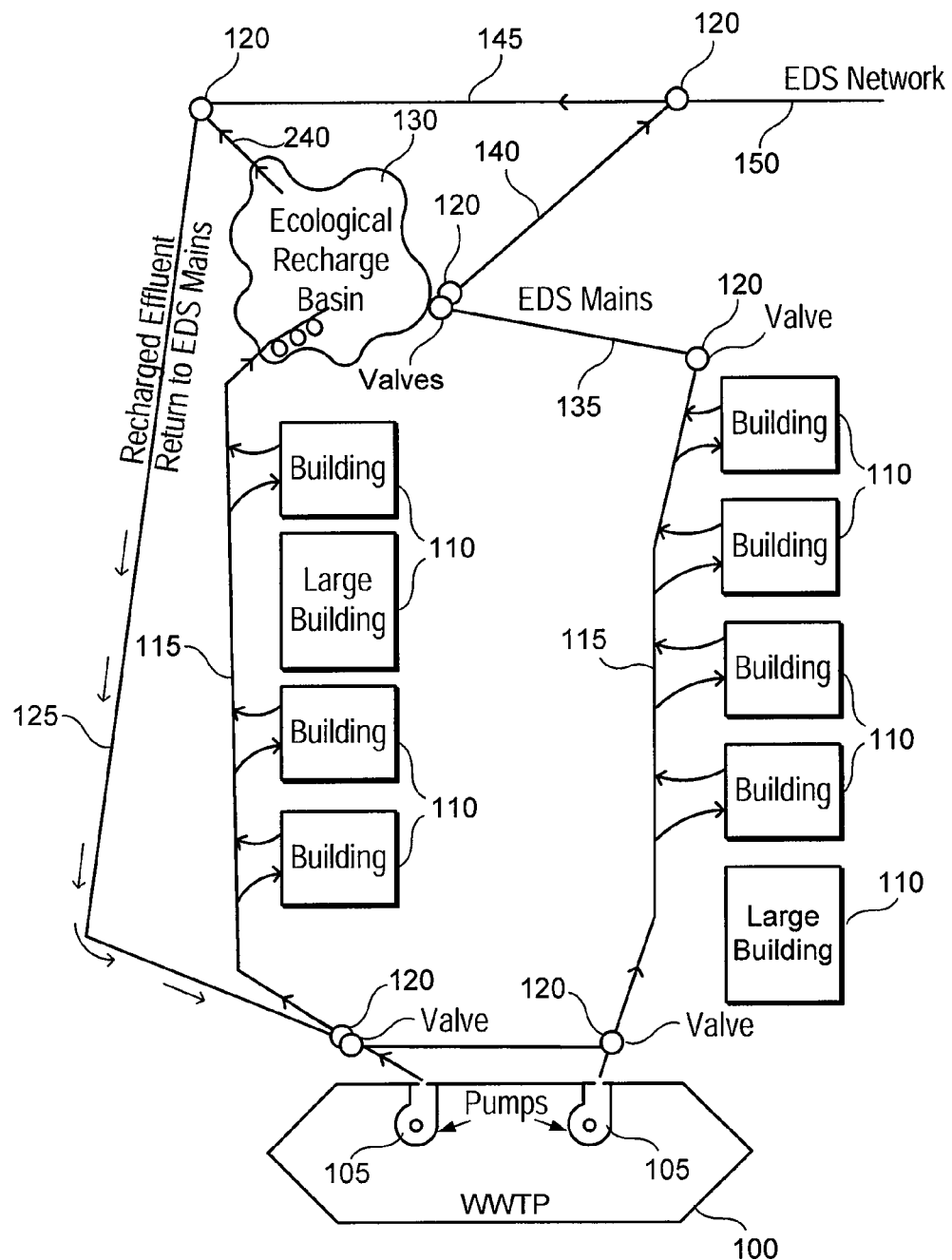
FIG. 1 is a block diagram of an effluent distribution system using a single main according to one exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure, and described in the claims appended hereto.

DETAILED DESCRIPTION OF EXEMPLARY EMBODIMENTS OF DISCLOSURE

Exemplary embodiments of the methods and systems according to the present disclosure will be described below.

In certain exemplary embodiments according to the present disclosure, each application can use mains below grade as part of an EDS to exploit the geothermal energy for heating and/or cooling buildings continuously year-round. Geothermal energy available to wastewater through an EDS can vary according to climate and soil conditions, and the feasibility or requirements of each EDS can vary from location to location. In addition, an EDS can utilize excess capacity to manage the reliability of a system-wide thermal load invariably affected by an interrupted distribution or extreme temperature. By aggregating daily volumes e.g., of effluent to fill an EDS designed for excess thermal load, such exemplary EDS can become a reliable reservoir of usable thermal energy sustained by exploiting the geothermal energy available below grade between buildings and at each ERB or WWTP.

One exemplary local EDS can also connect below grade to a contiguous and/or distant EDS, as a part of an integrated EDS network, which can improve the reliability of each EDS, and provide EDS designers with more options for distributing the thermal energy, and possibly facilitate fertilizing ERB vegetation. An exemplary EDS network can facilitate effluent from an urban EDS to assist in fertilizing food or energy crops at a distant rural ERB.

According to one exemplary embodiment of the present disclosure, an exemplary EDS can be configured and/or modified by using a suitable combination of ERBs and WWTPs to achieve the appropriate range of temperature, volume, and flow rate of effluent preferable for distributing the thermal load to heat and cool buildings continuously year-round. In both the dual-main EDS operations and/or a single-main EDS operation, pumping stations at WWTPs and at ERBs can exert pressure used to force effluent into the service lines of buildings, which is an operation similar to that of current natural gas distribution systems. For another exemplary EDS operation, it is also possible to add pumping stations at locations other than ERBs and WWTPs.

For example, each EDS can be configured to provide excess capacity to sustain reliability. Each exemplary EDS can operate by varying pressures, and use gravity flow when preferred for system efficiency and/or reliability. The exemplary different applications described herein can utilize pressurized distribution without gravity flow unless otherwise indicated. Other exemplary configurations can be configured to deliver effluent directly from a WWTP to an apparatus at an ERB at a relatively high point above sea level before distributing to buildings. This can be due to (a) support WWTP reliability, (b) possibly avail EDS of the gravity flow to buildings, and/or (c) other reasons pertaining to specific conditions of terrain, economy, environment, etc.

Each EDS can be operated by using a system-control center not unlike that in natural-gas-distribution operations, which regulates various pressures and flow rates at multiple points remotely, automatically, or manually. An EDS system-control center can, in addition, require monitoring of effluent temperature.

In addition, each EDS can incorporate and/or utilize alternative sources of energy, including, but not limited to (a) recovering mechanical energy from WWTP gravity flow at the head of the WWTP; (b) using windmills for mechanical drive or electric power; (c) using photovoltaic or solar-thermal installations; (d) applying thermal processes that convert wastewater solids into energy on site as well as other carbonaceous wastes or feed stocks—even energy crops (e.g., Switchgrass) harvested at ERBs; and/or e) using pressure-letdown technology for thermal or electric applications. In addition, these alternative sources of energy can include facilities such that supplemental measures are not limited by definitions of "Building," "ERB," "EDS," "WWTP," "Mains," etc. For example, a "Building" and its property can qualify as an ERB and consequently intensify local uses of alternative energy in that, e.g., thermally exploited effluent leaving the Building can qualify for solar-thermal applications on the same Building. When used in a solar-thermal loop, the Building's exploited effluent or a portion of that effluent can then be regulated below grade on site or discharged into on-site soil. The on-site groundwater increased by the Building's exploited effluent filtered through local soil can be recoverable for re-use in the combined geothermal-alternative-energy design of the Building. In another and/or additional exemplary use of alternative energy, designers may insert a "main" within a "main" to maximize regulation and/or recharge of thermally exploited effluent, as further described below with reference to FIG. 7.

In calculating the rate for regulating and/or recharging effluent temperature in EDS mains, various factors can be considered such as the size of the EDS main, heat-transfer properties of the main, depth below grade, volume and characteristics of soil surrounding the main, distance from other infrastructure that could affect geothermal conditions, the distance the effluent travels under geothermal conditions before reuse, etc. In such exemplary cases, the EDS capacity can be designed for extreme local climate temperatures for example.

The exemplary material usable for composing an EDS main can be suitable for both geothermal heat exchange and for enduring the chemical reactivity of the effluent. EDS mains can include operational apparatuses, such as pumps, valves, and regulators, to control flow at system pressure, as well as instruments to monitor pressure and temperature throughout the system. Exemplary valves and regulators at each building, ERB and WWTP can isolate failures by redirecting flow to preserve EDS integrity during effluent or equipment outages.

When an EDS is filled to design capacity, such EDS can become a grid of circulating, geothermally sustained effluent that may not require additional effluent. Thus, EDS can therefore have the ability to discharge effluent into an ERB to accommodate an additional, continuous discharge of effluent from a WWTP. As outages and leaks can occur, to sustain EDS configured capacity, the exemplary ERB can reduce or cease the discharge of effluent. ERBs according to certain exemplary embodiments of the present disclosure can also provide geothermal area below grade for regulating and/or recharging the thermal load of effluent that can then be reintroduced into EDS mains for a repeated delivery to buildings. Further, if an EDS is part of an exemplary EDS network, the ERB infrastructure, which controls the flow and supply of effluent at each ERB site, can be a likely nexus for exporting and/or importing effluent through a network transmission main.

Given sufficient, exemplary ERBs located within a single EDS, large-scale volumes of effluent from a single WWTP can be delivered, recovered, and/or its thermal load regulated as needed to heat and/or cool the buildings while also discharging effluent into ERBs and/or exporting effluent to the EDS network as needed, and/or importing effluent from the EDS network as needed.

Various factors that can be considered to modify exemplary configurations for using effluent, regulating its temperature, and/or reusing thermally exploited effluent in an EDS can be the below-grade geothermal area available within the proximity of the EDS mains, the energy needed to pump effluent to buildings and ERBs, and/or the per-building capacity of commercial heat-pump technology.

In addition to the EDS mains, exemplary apparatuses for regulating thermally exploited and/or depleted effluent recovered from heat-pump equipment in each building can include, but not be limited to, commercial apparatus suitable for regulating thermally exploited effluent. An exemplary plastic pipe that is coiled or otherwise arranged to maximize geothermal heat transfer below grade, for example, under public parks, playgrounds, parking lots, transportation terminals, streets, sidewalks, fields, property bordering buildings, and especially property at ERBs can also be implemented. Configuring EDS to provide the thermal energy to densely located, high thermal demand buildings can depend on, for example, constructing numerous ERBs and additional, decentralized WWTPs.

In the exemplary applications and/or configurations described herein, each building can have installed heat-pump equipment designed for year-round thermal demand. Each building can also, if necessary, be modified or retrofitted with a heating-ventilation-and-air-conditioning ("HVAC") infrastructure capable of or structured for distributing and/or maintaining the building load generated by the building's heat pump.

Each building can further maximize insulation, and can be connected to an EDS main so as to facilitate the flow to continue to successive buildings in the event of a building outage. For this purpose, a regulator at each connection to a building can be provided to reduce EDS main pressure (x) by a quantity of pressure (p) on the "service line" (e.g., a line of pipe that extends from the main below grade into the building's heat pump equipment). A service line pressure after the regulator can approximately be "x minus p." In some exemplary embodiments, a discharge pump, situated where thermally exploited and/or depleted effluent exits the heat pump, can return a portion of thermally exploited effluent to the EDS main at a predetermined pressure associated with an EDS. In some exemplary embodiments, gravity can be used to transmit thermally exploited and/or depleted effluent through, for example, existing sewer lines. Some exemplary embodiments facilitate discharge of thermally exploited and/or depleted effluent by using pressure and/or gravity.

According to certain exemplary embodiments, each building can use some or all available geothermal area on site, which can reduce the demand on an EDS by either reducing (i) a demand on thermal load entering a building's heat pump and/or (ii) a demand on regulating the thermal load that returns to the EDS main from the building's heat pump. Different issues can be considered such as whether to use on-site geothermal area for effluent entering the heat pump and/or returning to an EDS from the heat pump. For example, using a closed loop of an on-site geothermal load for effluent entering the heat pump can facilitate at least a partial load providing some on-site geothermal energy for the building in the event of an EDS disruption. Different exemplary embodiments described herein can facilitate regulating and/or recharging at least a portion of thermally exploited effluent on site, and/or returning that regulated portion of effluent to the heat pump equipment on site. In the event of an EDS main outage in the winter, on-site partial load can be modified, if necessary, through temporary hot tap-water flow and/or an electric heating element that can be attached to a line returning to the heat-pump apparatus, which can assist in sustaining a minimum building temperature.

According to another exemplary embodiment, if a building has geothermal area on site sufficient to regulate and/or recharge its thermally exploited effluent or if a nearby geothermal area is available to sustain the building, the building can be isolated from the EDS load. The building can also be connected to an EDS for a redundant load (e.g., to fill the building's equipment in the event of an on-site outage). If a group of buildings has a sufficient combined geothermal area in common or nearby to regulate and/or recharge the thermally exploited effluent of the entire group, such group of buildings can be isolated from the EDS. This group of buildings can be connected to the EDS for the redundant load (e.g., to fill the buildings' equipment in the event of an on-site outage).

Exemplary EDS can be connected to several outlets of a WWTP (e.g., at pumps 105 of apparatus 100 of FIG. 1), and each EDS main can be pressurized at the WWTP outlet e.g., independently and/or redundantly to provide the reliability of a WWTP effluent flow. Interruptions and surges in WWTP flow can be accounted for, which affects the quality and quantity of effluent discharged from a WWTP into an EDS. Effluent from the WWTP can be pumped into the EDS to keep mains full and pressurized for a continuous flow and at rates of flow that can satisfy extremes of building temperature.

An exemplary ERB (e.g., system 130 of FIG. 1) can receive effluent at an EDS rate of discharge determined by EDS requirements or preferences, which can include sustaining the minute-to-minute continuity of effluent being discharged by a WWTP. Each ERB can use equipment or arrangement of mains on site to geothermally regulate and/or recharge thermally exploited effluent as needed, return geothermally-regulated effluent to the EDS mains as needed, discharge excess effluent into an ERB, export excess effluent to the EDS network main and/or import from the EDS network main.

Extreme weather conditions (e.g., temperature and precipitation) can affect ERB sites. Therefore, the reliability of EDS operations can depend on variegated location of ERBs (e.g., variegation abundantly enhanced by an EDS network). To operate reliably under winter conditions, according to one exemplary embodiment, an ERB can discharge effluent below grade or other suitable solution. Conditions permitting, effluent can be discharged on the surface or near the surface.

The selection of an ERB can take into consideration a regulatory oversight, which can involve a determination that the effluent discharged into wild or cultivated vegetation would not be a health or environmental hazard. ERB sites can be designated with a combined capacity that can absorb more than the daily flow of effluent from a WWTP year-round. EDS reliability can be maintained by controlling the rate of discharging the effluent into an ERB, exporting effluent to another EDS, or importing effluent from another EDS.

Various other considerations can also be addressed in the exemplary applications described according to the exemplary embodiments of the present disclosure. For example, municipalities can reduce demand on a storm-water infrastructure by recovering the storm water through roof top gardens and/or comparable on-site drainage or recovery to support delivery of geothermal energy to on-site heat-pump equipment. Redundant equipment in each EDS, ERB and/or building can be provided to maintain reliability. Further, revenues from thermal demand can be sufficient to recover the cost of installing, maintaining, and operating an EDS in any exemplary application or combination of applications.

Although several exemplary applications are described below, numerous applications and different embodiments are possible, as would be known to one of ordinary skill in the art after an understanding of the present disclosure.

In the exemplary EDS illustrated in FIG. 1, according to one exemplary embodiment of the present disclosure, effluent can be delivered from a WWTP to ERBs, while heating and cooling buildings selectively connected to such EDS. Initially, as illustrated in FIG. 1, a WWTP 100 having effluent is provided, where several parallel EDS mains 115 can be connected to WWTP 100 through pumps 105, valves 120, and regulators at outlets of WWTP 100. The pumps 105 can provide the pressure in the EDS mains 115 for effluent from WWTP 100. The EDS mains 115 are connected to each building 110, and each EDS main 115 below grade can be extended in e.g., a serial line that extends parallel to water or gas mains to at least one ERB 130 by, e.g., mains 135. Each EDS main 115 can be connected to a distribution apparatus at each ERB 130. Effluent can be transmitted to another EDS through a main 140, or from another EDS through main 145.

The EDS mains 115, which can deliver effluent to the selected buildings 110 and recover a portion of the thermally exploited and/or depleted effluent from each selected building 110, can also loop and/or extend away from the line of water and gas mains to pass through an available nearby geothermal area below parks, parking lots, ERBs etc., and then return to the line following water and gas mains to each building 110.

Figure 2:
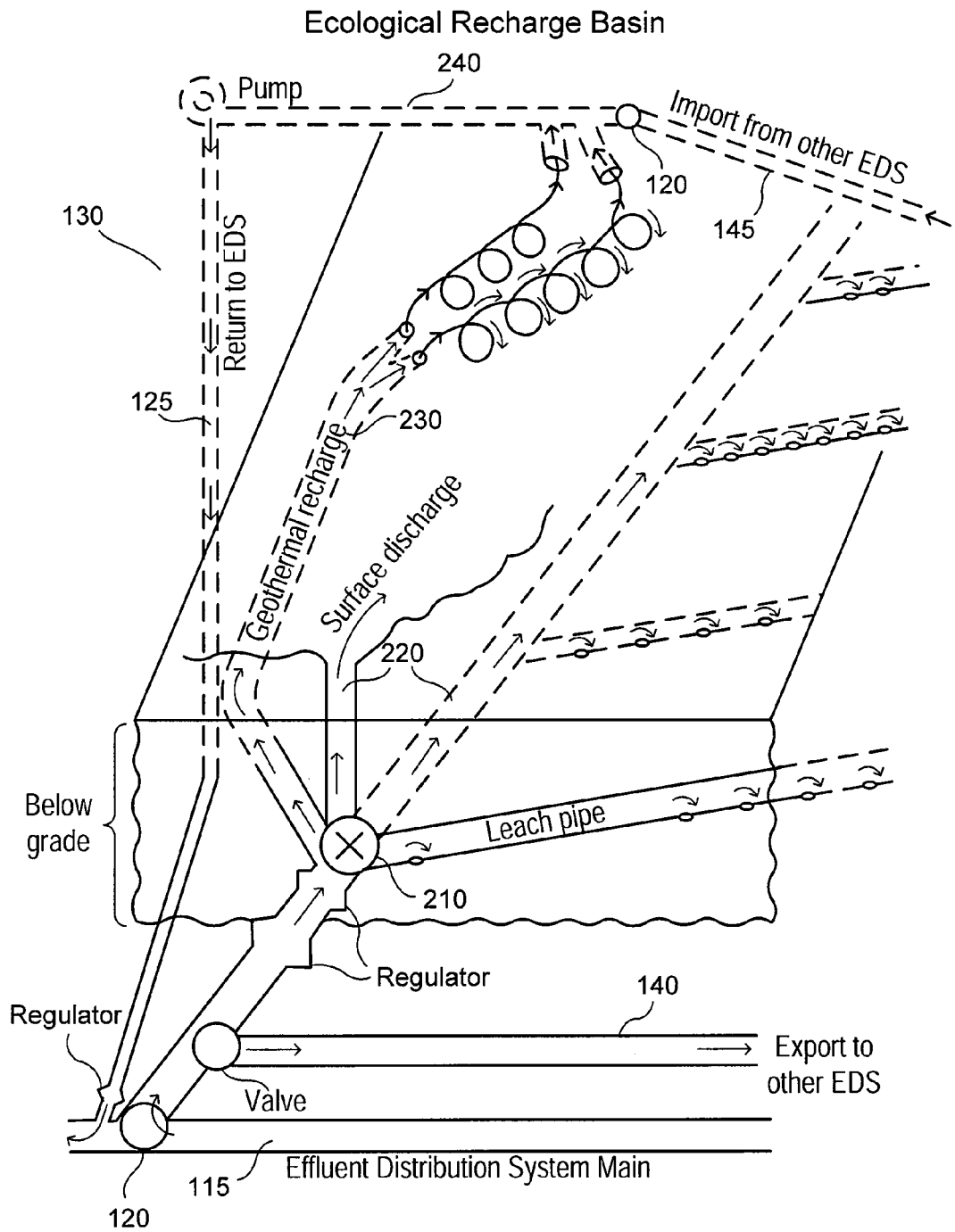
FIG. 2 is an illustration of an ecological recharge basin system according to an exemplary embodiment of the present disclosure which can utilize the distribution system of FIG. 1, FIG. 4, and/or FIG. 6 (described therein below)

In the exemplary ERB 130, as illustrated in FIG. 2, an ERB distribution apparatus 210 is provided which can deliver effluent to mains 220 to discharge part or all of the effluent into the ERB 130, a main 230 is provided which can circulate below grade and thereby regulate thermally exploited and/or depleted effluent at the ERB 130, a main 240 is provided which can return geothermally regulated and/or recharged effluent to the EDS mains 115 through the single return line 125 to the WWTP valves 120 for redistribution without returning into the WWTP, and/or a main 140 is provided which can be extended to a distribution apparatus of a contiguous EDS (not shown in FIG. 2). Also, a main 145 can be provided which can be extended to a distribution apparatus of a contiguous EDS (not shown in FIG. 2).

The distribution apparatus 210 (e.g., a pump integrated with valves and regulators) provided at each ERB 130 can circulate effluent at a rate that can produce a continuous EDS flow from WWTP 100 to facilitate regulating and/or recharging the portion of thermally exploited and/or depleted effluent recovered from each building 110. In the event of a WWTP outage or to manage the fluctuations of WWTP flow, the ERB distribution apparatus 210 can cease discharging effluent into the ERB 130 and/or transmitting effluent to another EDS through the main 140, and back feed all geothermally regulated effluent at ERB 130 through the EDS main 125. In such exemplary events, mains 150 and 145 can back feed the affected EDS with effluent from a network EDS.

Figure 3:
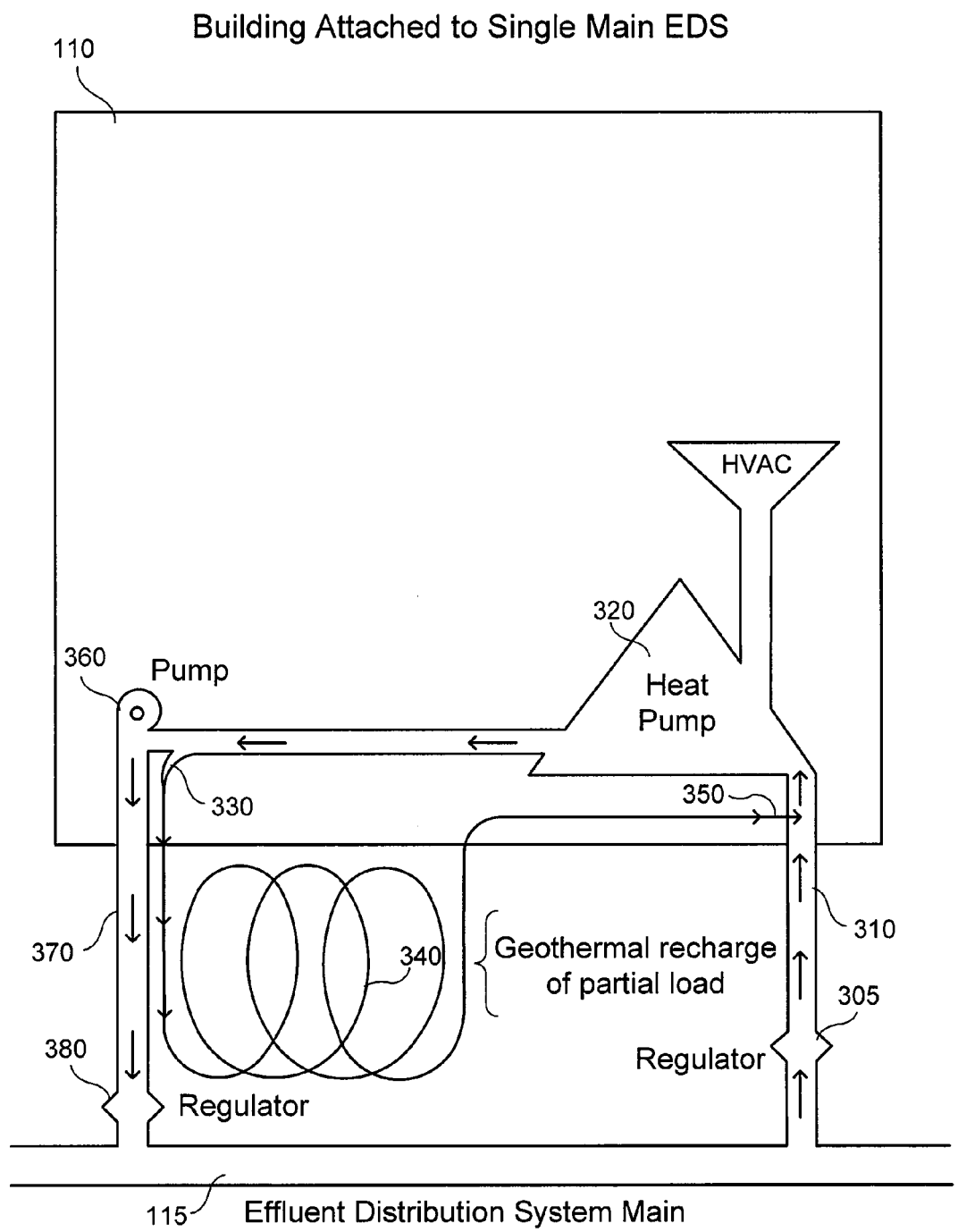
FIG. 3 is an illustration of a building using the single main effluent distribution system of FIG. 1 according to an exemplary embodiment of the present disclosure.

FIG. 3 illustrates a detailed diagram of a single building 110 attached to a single EDS main 115, as shown in FIG. 1 in accordance with the exemplary embodiment of the present disclosure. As illustrated in FIG. 3, the EDS main 115 can be connected to a building 110 that can be selected so that the geothermal area on or between the properties of each connected building provides sufficient geothermal energy to regulate and/or recharge the portion of thermally-exploited and/or depleted effluent discharged from each building's heat-pump equipment for use by the next selected building in series, as shown in FIG. 1.

Effluent can enter the building 110 through a service line 310 to a heat-pump/HVAC equipment 320. Then, a portion of effluent can exit each building's heat pump/HVAC equipment 320 at a portion 330. Then effluent can circulate through an on-site geothermal-regulating and/or recharging equipment 340, and then return to the service line 310 at portion 350, and finally to the same on-site heat pump/HVAC equipment 320. The amount of effluent circulating on site can be determined by the capacity of the on-site geothermally regulating and/or recharging equipment 340, which can be, e.g., piping coiled below grade to provide an appropriate geothermal area for regulating and/or recharging that portion of thermally exploited and/or depleted effluent flowing back to the heat pump/HVAC equipment 320.

A portion of effluent exiting the heat pump/HVAC equipment 320 at portion 360, and likely not recirculated on site can be pumped through a separate discharge line 370 to the original EDS main 115, through a regulator 380, at both a distance from the service line 310 entering the building 110 and at a pressure pre-determined to support EDS flow, temperature, and pressure. The pressure from the pumps 105 in WWTP 100 (see FIG. 1), the distribution apparatus 210 (see FIG. 2) and other select locations can be used to deliver effluent to each building's service line 310. A regulator 305 at the service line 310 of each building can accept a main pressure "x", and reduce it by "p" units of pressure so that effluent can enter the building 110 and its heat pump 320 at the service line 310 at x–p pressure. This can be done such that the heat pump 320 operates at approximately x–p pressure.

Figure 4:
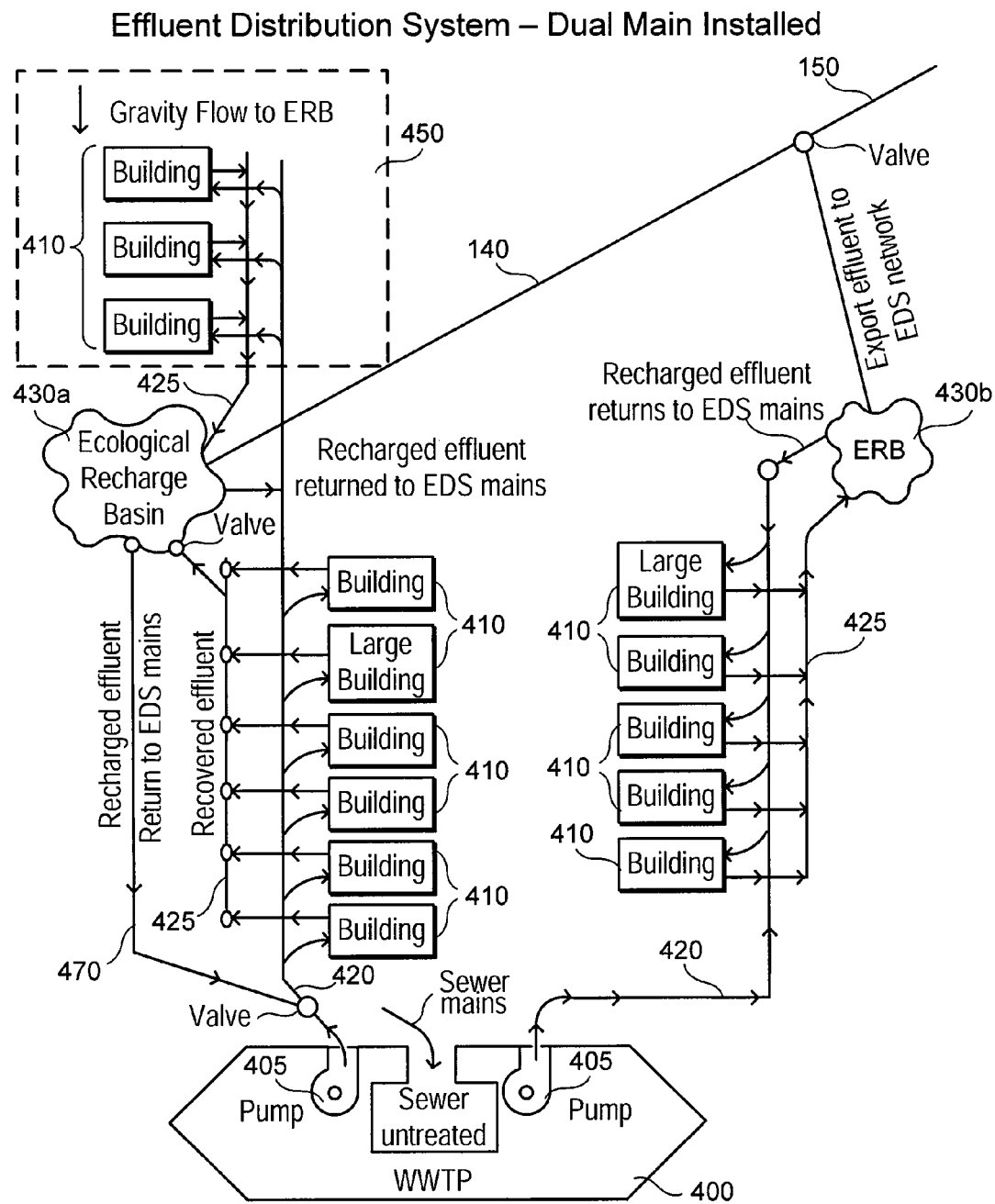
FIG. 4 is a block diagram of the effluent distribution system using a dual-main effluent distribution system according to an exemplary embodiment of the present disclosure.

In the exemplary EDS illustrated in FIG. 4, according to another exemplary embodiment of the present disclosure, the buildings can be heated and/or cooled by installing mains dedicated to delivering effluent to buildings and mains dedicated to recovering effluent from the buildings.

As illustrated in FIG. 4, e.g., a WWTP 400 can be provided which can include pumps 405 for distributing effluent along two separate systems of mains below grade, i.e., mains 420 and mains 425. The mains 420 can deliver effluent to buildings 410, and the mains 425 can recover thermally exploited and/or depleted effluent from the buildings 410. The mains 420 delivering effluent to the buildings 410 can be connected to one or more distribution apparatuses 405 (e.g., pumps) at a WWTP outlet, and to distribution apparatuses 210 (as shown in FIG. 2) at, e.g., ERB 430*a* and ERB 430*b*. The pressure utilized to deliver effluent to each building can be controlled through equipment at WWTP 400 and at each ERB 430*a*, 430*b*.

As illustrated in FIG. 5, the delivering mains 420 can be connected to a service line 510 of one or more of the buildings 410 as designed capacity can facilitate, and possibly to all buildings connected to the EDS. A regulator 505 can be provided on the service line 510 of each building 410 that can take a main pressure x, and reduce such pressure x by p units of pressure so that effluent enters the building 410 and its heat-pump/HVAC equipment 520 at (x–p) pressure. The heat-pump/HVAC equipment 520 can then operate at approximately (x–p) pressure. The recovering mains 425 can also be connected to each selected building 410.

A portion of the thermally exploited and/or depleted effluent can exit the heat-pump/HVAC equipment 520 at a portion 530, and can circulate through on-site geothermally regulating and/or recharging equipment 540, and return to the service line 510 and the same on-site heat pump/HVAC equipment 520. The amount of effluent circulating on site can be determined by the installed-capacity of the on-site geothermally regulating and/or recharging equipment 540. A remaining portion of thermally exploited and/or depleted effluent can exit the heat pump/HVAC equipment 520 at a portion 560, and/or be discharged through a discharge line 570 under pressure and/or by gravity flow, through regulator 580 to the main 425 recovering effluent from each building 410.

The mains 425 recovering effluent can be connected to apparatuses at ERBs, as shown in FIG. 4, and be thereby likely isolated from the flow and pressure of WWTP 400. Moreover, the mains 425 that are configured to recover effluent can be isolated into territorial sections 450 of the EDS so that the mains 425 in one section (e.g. 450) dedicated to a single ERB can, depending on the topography of such particular section, recover effluent and deliver it to the ERB 430*a* through, e.g., a gravity flow. By dedicating a selected section of the recovery mains 425 to the gravity flow, the EDS can recover effluent through gravity flow mains in as many sections as possible, and thereby likely reduce the energy used to operate the EDS. Further, depending on the location of the ERB(s), delivery mains from an ERB can likewise use gravity flow.

At each ERB (e.g., ERBs 430*a* and 430*b*), recovered effluent can be discharged into ERB 430*a*, 430*b* through the recovery mains 425, and/or exported to another EDS through the mains 140 and 150, as needed. Further, recovered effluent, when geothermally regulated, can be returned from the ERB 430*a* through the mains 470 under pressure, and back fed into the EDS delivery main 420 at virtually any of several locations (not shown in FIG. 4) through a distribution apparatus at the ERB 430*a* as necessary, and/or imported from EDS network through mains 150 and 145 as necessary.

Figure 6:
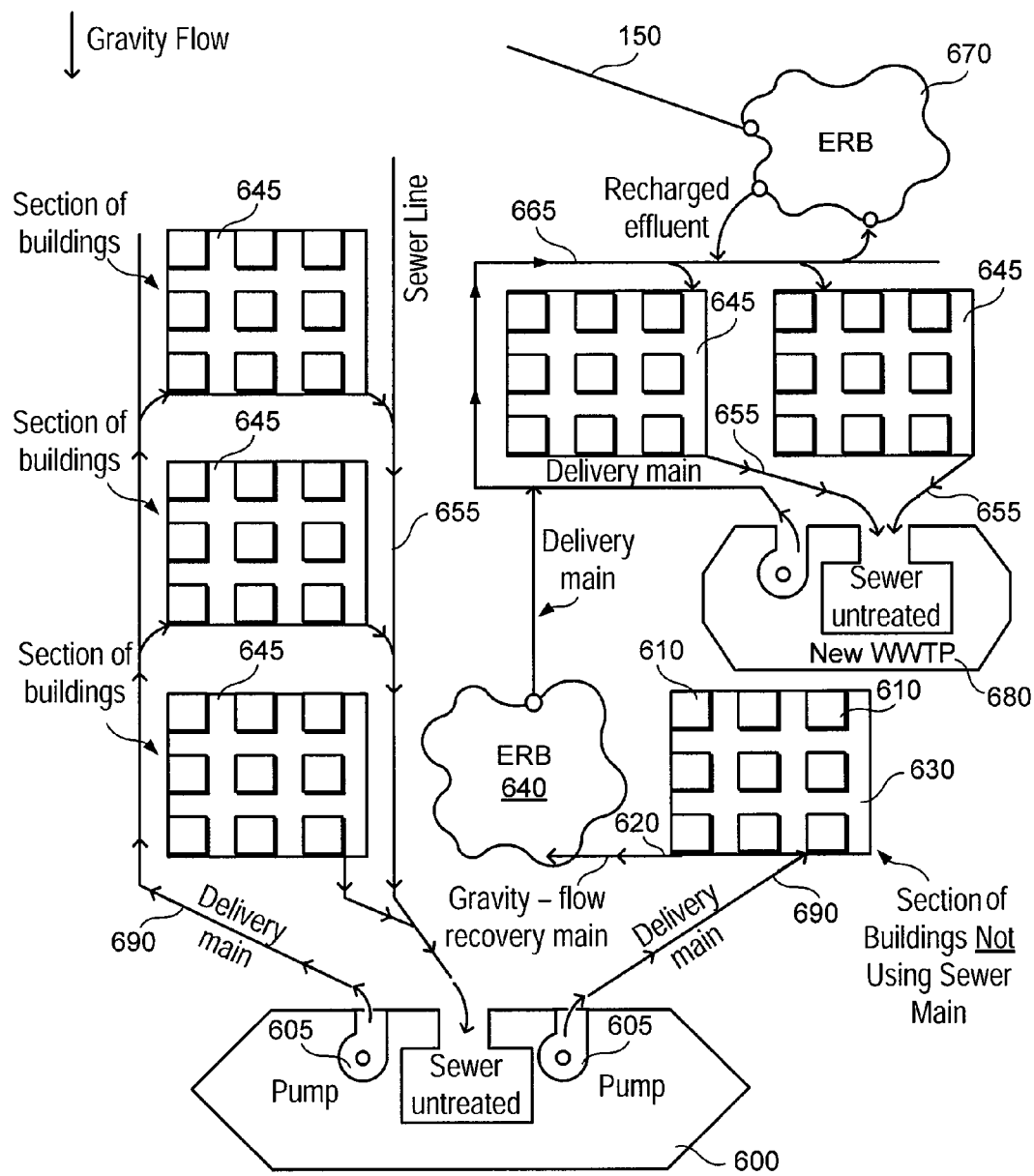
FIG. 6 is an illustration of the effluent distribution system having a dual main and using natural-gas mains and sewer mains according to an exemplary embodiment of the present disclosure.

In the exemplary EDS illustrated in FIG. 6, according to still another exemplary embodiment of the present disclosure, previously installed natural gas mains can be used to distribute WWTP effluent to heat and cool buildings, and sewer mains can be used to recover thermally exploited and/or depleted effluent. For example, former natural-gas-distribution systems can be used to deliver effluent to buildings after a modification of the gas system's infrastructure. When the local natural-gas-distribution system has been configured to distribute effluent, each gas service line (e.g., the line of pipe once connecting each building below grade to a gas main) can be converted to accommodate the delivery of effluent.

Similarly to the description associated with FIG. 5, according to another exemplary embodiment of the present disclosure, a regulator on a service line of each building can take a main pressure x, and reduce it by p units of pressure so that effluent enters the building and its heat pump at (x−p) pressure. The heat pump can then operate at approximately (x−p) pressure. Further, similarly to the description of FIG. 5, part or all of the thermally-exploited and/or depleted effluent can be transmitted from the heat pump equipment to the on site geothermally regulating and/or recharging apparatus or piping for recirculation directly to the heat pump equipment in each building. The remainder of thermally-exploited and/or depleted effluent can be transmitted to each building's sewer line to commingle with untreated waste water, and be geothermally regulated through the sewer mains and subsequent WWTP operations.

As illustrated in FIG. 6 which is directed to still another exemplary embodiment of the present disclosure, a WWTP plant 600 can be provided with pumps 605 connected to delivery mains 690, similar to the embodiment described herein with reference to FIG. 4. A section 630 of an EDS can utilize less energy by installing mains 620 for recovering effluent under the gravity flow from each building 610 in such section 630. Recovered effluent can then be delivered directly to an ERB 640 for redistribution, discharge, and/or export to another EDS (as described herein with reference to FIG. 1).

Certain sections of buildings 645 that use sewer mains 655 for recovering effluent can deliver effluent to and/or receive effluent from ERBs 640 and 670 through delivery mains 665. Then, new de-centralized WWTPs 680 can be connected to the existing sewer mains 655 to divert additional effluent flow commingling with the wastewater away from original WWTP 600. Effluent from these decentralized WWTPs 680 can be pumped into an EDS delivery main 665.

Figure 7:
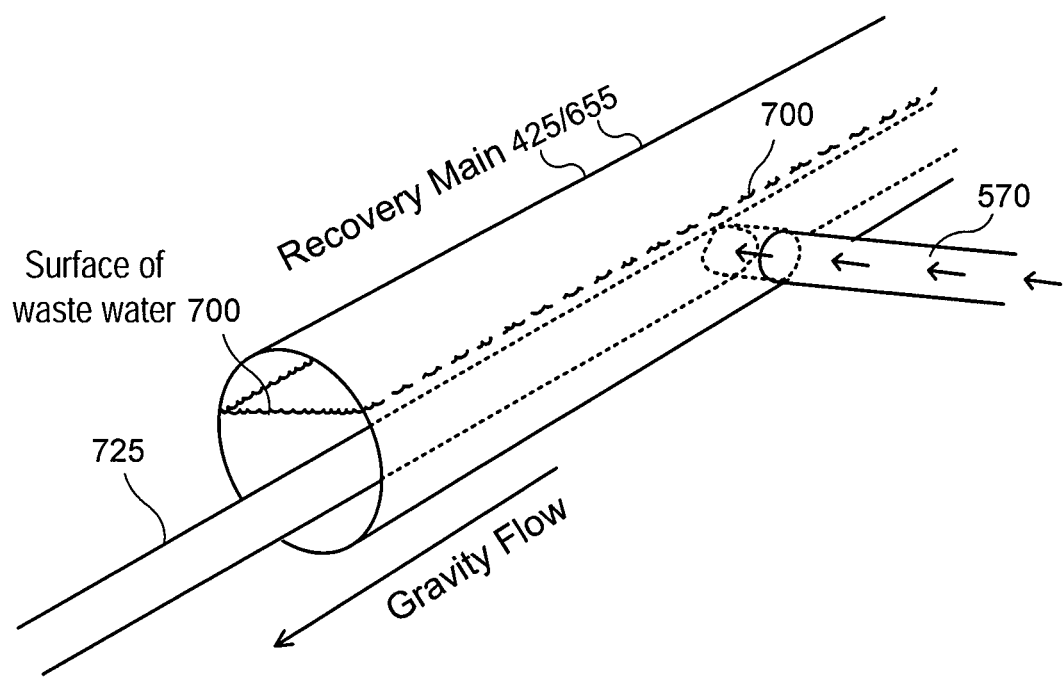
FIG. 7 is an illustration of the effluent distribution system mains installed within another main according to an exemplary embodiment of the present disclosure.

As illustrated in FIG. 7, which is directed to still another exemplary embodiment of the present disclosure, one or more distribution systems can include a "main" within a "main" to maximize regulation and/or recharge of thermally exploited effluent. For example, in FIG. 7 with reference to FIG. 5, recovered effluent from each building 410 can leave heat-pump apparatus 520 via discharge line 570 to enter main 425. Discharge line 570 may connect through the structure of main 425 to an inner main 725. Inner main 725 may be installed and run within main 425 and below the surface of wastewater flow 700 as illustrated in FIG. 7. In this example, main 425 can act as a sewage main 655 conveying wastewater to a WWTP by gravity flow at a temperature approximating 70° F., which can most efficiently regulate the temperature of each effluent portion 560 from each building 410. The main 725 can thus deliver regulated and/or recharged effluent via gravity flow and/or under pressure to a distribution apparatus at an ERB or a heat-pump apparatus at buildings 410.

A diameter of effluent main 725 can be smaller than a diameter of recovery main 425/655 at any ratio configured to facilitate continued use of recovery main 425 while effluent main 725 is installed within (e.g, at least ten percent smaller). The arrangement of a main within a main can provide a less expensive installation, as much of the otherwise needed excavation can be eliminated. Further, the example arrangement illustrated in FIG. 7 can facilitate substantial thermal energy transfer between wastewater 700 and effluent 725, while preventing the wastewater and effluent from mixing. Such mixing can have negative consequences, as discussed in other exemplary embodiments, destabilizing gas (e.g., when using pre-existing gas lines), and/or adding to the wastewater volume that should be treated (e.g., when using pre-existing sewer lines), which can require construction of additional WWTP capacity. With a main installed within a main, most of the economic savings and thermal energy transfer benefits can be achieved, without the potentially adverse consequences of mixing pre-existing material with effluent.

While certain exemplary embodiments can install a main within a pre-existing main, other exemplary embodiments can manufacture the main within a main arrangement in the first instance, installing them as one piece. Other exemplary embodiments can install a first main, and then install the main within that main. While leveraging pre-existing mains (e.g., wastewater lines) can provide an economical advantage, some applications (e.g., where there are no pre-existing wastewater lines and/or where the lines are not large enough) can be implemented with newly installed mains and newly installed mains within those mains.

In an alternative exemplary embodiment of the exemplary EDS illustrated in FIG. 1, pumping effluent from the WWTP 100 through the EDS main to a series of buildings for heating and/or cooling can return a portion of thermally exploited and/or depleted effluent from each building into the same EDS main, which can in turn deliver the effluent to each successive building and ultimately to one or more ERBs. Sufficient area between buildings can be used to geothermally regulate and/or recharge thermally exploited and/or depleted effluent discharged from the heat pump equipment of the building before delivering the geothermally regulated effluent to the next building. If sufficient area between buildings is not available, the single-main EDS can primarily serve as a means of generating energy revenue to recover the cost of discharging effluent into ERBs locally or through the EDS network.

In alternative exemplary embodiments of the exemplary EDSs of FIGS. 4 and 6, thermal load can be provided to the buildings by using the mains dedicated to delivering effluent to the buildings separately from the mains dedicated to recovering thermally exploited and/or depleted effluent from the buildings. The recovery mains can reduce or eliminate a limitation on geothermal potential caused by, e.g., a limited distance between the buildings, and possibly exploit the geothermal potential extensively, e.g., through the generation of numerous ERBs or even adding small-scale, decentralized WWTPs.

In alternative exemplary embodiments of FIGS. 4 and 6, the exemplary EDSs can utilize an installation of new mains amidst crowded electric, gas, water, and telecommunication infrastructure below streets. The exemplary embodiment illustrated in FIG. 6 can avoid or minimize the addition of the recovery mains below streets by using the existing network of sewer mains or storm-water mains, and also can utilize existing and/or new gas mains for delivering effluent to avoid or minimize the addition of the delivery mains below streets.

Figure 8:
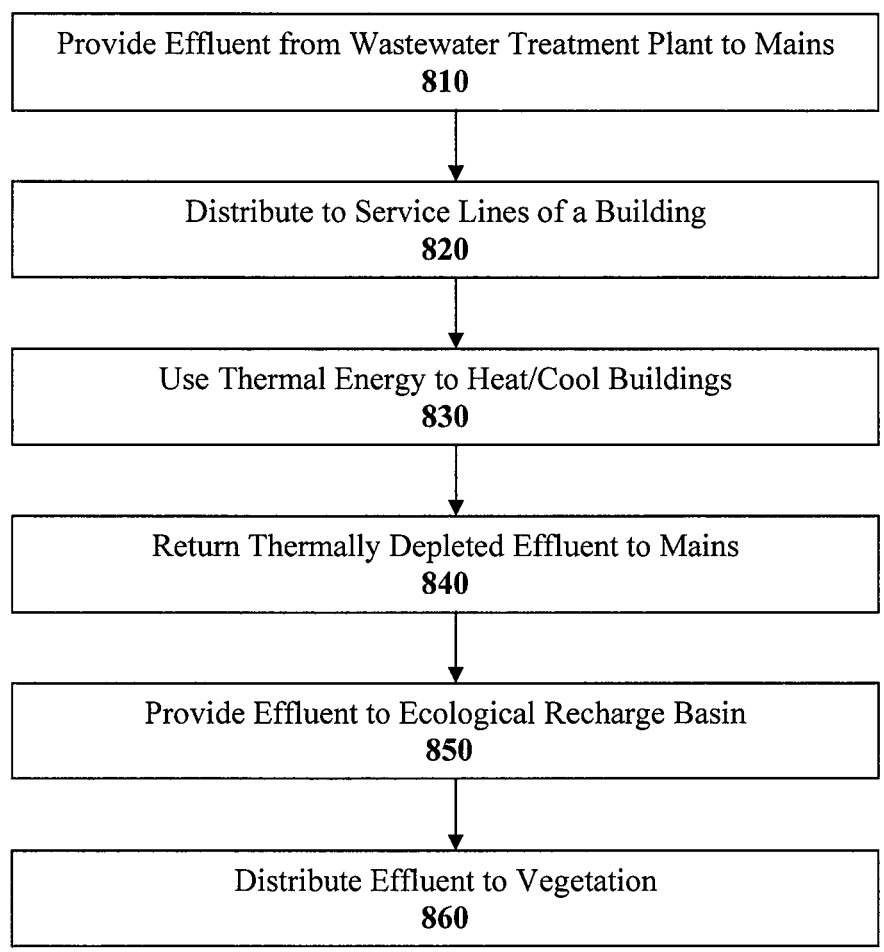
FIG. 8 is a flow diagram of a method according to an exemplary embodiment of the present disclosure.

FIG. 8 illustrates a flow diagram of a method for providing effluent from a wastewater treatment plant according to an exemplary embodiment of the present disclosure. For example, at block 810, effluent can be provided from a WWTP to one or more mains that are connected to a distribution apparatus (e.g., pumps) at a WWTP that can regulate, e.g., the pressure and flow of effluent. Effluent can then be provided from the mains to the service lines of one or more buildings at block 820. As described herein, effluent can be distributed to the heat-pump/HVAC equipment of one building, recovered and regulated, and then distributed to another building (e.g., exemplary embodiment illustrated in FIG. 1), and/or distributed from one main and returned to another main (e.g., exemplary embodiment illustrated in FIG. 4). Various other exemplary applications can be made possible and are not limited to the above-described exemplary embodiments. Then, the thermal energy can be used by the heat-pump/HVAC equipment of the building to heat/cool the buildings at block 830, and after use, the thermally exploited and/or depleted effluent can then be returned to the mains at block 840. The thermally exploited and/or depleted effluent can be returned to the same main that provided the effluent to the building, or a separate main, as described herein.

The thermally exploited and/or depleted effluent can be geothermally regulated (e.g., exemplary embodiment illustrated in FIG. 1) before distribution to another building, or, can then be distributed to an ecological recharge basin at 850. The effluent is distributed (as described herein with reference to FIG. 2) to the vegetation and/or soils at 860, and nitrogen in the effluent can be withdrawn by the crops/vegetation and used for growth, before the denitrified effluent reaches aquatic habitats. The crops/vegetation can denitrify the effluent and thereby provide an advantage such that aquatic habitats are not polluted by nitrogen compounds that are currently discharged through existing systems directly into aquatic habitats. As described herein, part or all of the effluent can also be distributed to another EDS, and/or returned as backfeed to the WWTP.

The exemplary embodiments of the present disclosure can be used in various configurations and in different locations. The exemplary methods and systems can provide for various mains used in different configurations with buildings, WWTPs and ERBs, and are not limited by the various exemplary embodiments described herein. The effluent can be provided to various fertilization systems, including ecological recharge basins, where crops and/or other vegetation are provided. The effluent can be provided to the soil/vegetation directly, and/or to one or more pipes through various distribution systems to the fertilization system and/or area.

The foregoing merely illustrates the principles of the present disclosure. Various modifications and alterations to the described embodiments will be apparent to those skilled in the art in view of the teachings herein. Various exemplary embodiments described herein can be used with one another interchangeably. It will thus be appreciated that those skilled in the art will be able to devise numerous techniques which, although not explicitly described herein, embody the principles of the present disclosure and are thus within the spirit and scope of the present disclosure. All patents and publications cited herein are incorporated herein by reference in their entireties.

What is claimed is:

1. A method for providing effluent from a wastewater treatment plant, comprising:
    distributing effluent from a wastewater treatment plant to at least one building for providing thermal energy to the at least one building;
    providing the effluent from the at least one building to a delivery arrangement; and
    providing the effluent from the delivery arrangement to a fertilization system;
    wherein the effluent is distributed from the wastewater treatment plant to the at least one building using existing gas lines.

2. The method of claim 1, further comprising:
    returning the provided effluent from the fertilization system for a redistribution to one or more buildings.

3. The method of claim 1, wherein the fertilization system comprises one or more ecological recharge basins.

4. The method of claim 3, wherein nitrogen is provided by the effluent to the one or more ecological recharge basins.

5. The method of claim 4, wherein the one or more ecological recharge basins denitrifies the effluent before the effluent is provided to an environmental habitat.

6. The method of claim 1, wherein the delivery arrangement comprises one or more pipes below grade.

7. The method of claim 1, wherein the effluent is distributed from the wastewater treatment plant to the at least one building and provided to the fertilization system by the delivery arrangement.

8. The method of claim 7, wherein the delivery arrangement comprises a main pipe.

9. The method of claim 7, wherein the delivery arrangement comprises at least one pipe for distributing the effluent from the wastewater treatment plant to the at least one building and at least one separate pipe for providing the effluent to the fertilization system.

10. The method of claim 1, wherein the effluent provided from the delivery arrangement to the fertilization system includes substantially all of the effluent from the wastewater treatment plant, and wherein the fertilization system is independent of an aquatic habitat.

11. The method of claim 1, wherein the effluent is distributed in a first pipe having a diameter smaller than a second pipe, and wherein the first pipe is located within the second pipe.

12. The method of claim 11, wherein the diameter of the first pipe is at least ten percent smaller than the diameter of the second pipe.

13. The method of claim 12, wherein the second pipe is at least part of a pre-existing wastewater line.

14. A system for providing effluent from a wastewater treatment plant, comprising:
    a wastewater treatment subsystem configured to provide effluent to a first delivery arrangement, wherein the first delivery arrangement facilitates the effluent to at least one building, the at least one building including a heat-pump arrangement configured to utilize thermal energy from the effluent; and
    a second delivery arrangement which is configured to receive the utilized effluent from the at least one building and distribute the utilized effluent to a fertilization system;
    wherein substantially all the effluent from the wastewater treatment plant being discharged from the system is provided via the second delivery arrangement.

15. The system of claim 14, wherein the fertilization system comprises one or more ecological recharge basins.

16. The system of claim 14, wherein the first delivery arrangement uses at least one of: newly-installed mains or pre-existing sewage mains.

17. The system of claim 16, wherein the newly-installed mains and the pre-existing sewage mains include gravity-flow mains.

18. The system of claim 14, further comprising:
    a plurality of decentralized wastewater treatment plant arrangements, which maximize a recovery of the effluent via pre-existing sewage mains.

19. The system of claim 14, wherein the system is configured to operate independent of an aquatic habitat.

20. The system of claim 14, wherein the heat-pump is configured to at least on of heat or cool the effluent.

21. The system of claim 14, wherein the fertilization system denitrifies the effluent before the effluent is discharged into an environmental habitat.

22. The system of claim 21, wherein the environmental habitat includes land area that supplies a water table.

23. The system of claim 14, wherein the first delivery arrangement includes an effluent main installed within a further main that is larger than the effluent main.

24. The system of claim 23, wherein the further main is at least part of a pre-existing wastewater main.

25. The system of claim 23, wherein a diameter of the effluent main is at least ten percent smaller than a diameter of the further main.

26. The system of claim 23, wherein the effluent main is installed within the further main such that thermal energy from a first material that is inside the further main and outside the effluent main is transferred to a second material that is inside the effluent main without the first material mixing with the second material.

27. A method for providing effluent from a wastewater treatment plant, comprising:
    distributing effluent from a wastewater treatment plant to at least one building for providing thermal energy to the at least one building;
    providing the effluent from the at least one building to a delivery arrangement; and
    providing the effluent from the delivery arrangement to a fertilization system;
    wherein the effluent provided from the delivery arrangement to the fertilization system includes substantially all of the effluent from the wastewater treatment plant, and wherein the fertilization system is independent of an aquatic habitat.

28. A method for providing effluent from a wastewater treatment plant, comprising:
    distributing effluent from a wastewater treatment plant to at least one building for providing thermal energy to the at least one building;
    providing the effluent from the at least one building to a delivery arrangement; and
    providing the effluent from the delivery arrangement to a fertilization system;
    wherein the effluent is distributed in a first pipe having a diameter that is at least 10 percent smaller than a second pipe, and wherein the first pipe is located within the second pipe.

29. A system for providing effluent from a wastewater treatment plant, comprising:
    a wastewater treatment subsystem configured to provide effluent to a first delivery arrangement, wherein the first delivery arrangement facilitates the effluent to at least one building, the at least one building including a heat-pump arrangement configured to utilize thermal energy from the effluent; and
    a second delivery arrangement which is configured to receive the utilized effluent from the at least one building and distribute the utilized effluent to a fertilization system;
    wherein the first delivery arrangement includes an effluent main having a diameter that is at least 10 percent smaller than a further main, and wherein the effluent main is installed within the further main.

* * * * *